Figure 1:
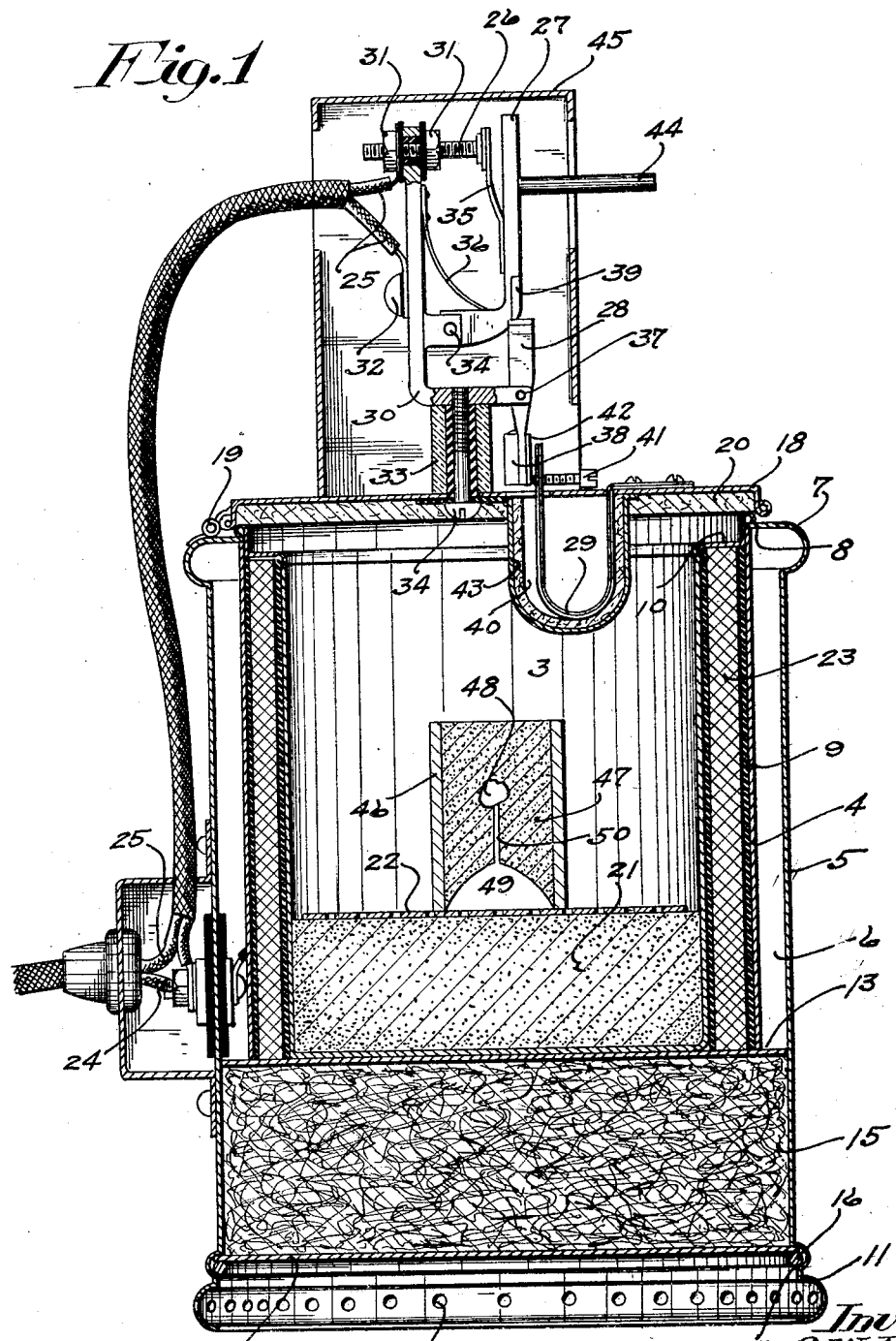

July 21, 1931. G. W. HARRIS 1,815,060
DENTAL WAX ELIMINATOR
Filed Sept. 10, 1928 2 Sheets-Sheet 1

Inventor
G.W. Harris
By his Attorneys

July 21, 1931. G. W. HARRIS 1,815,060
DENTAL WAX ELIMINATOR
Filed Sept. 10, 1928 2 Sheets-Sheet 2
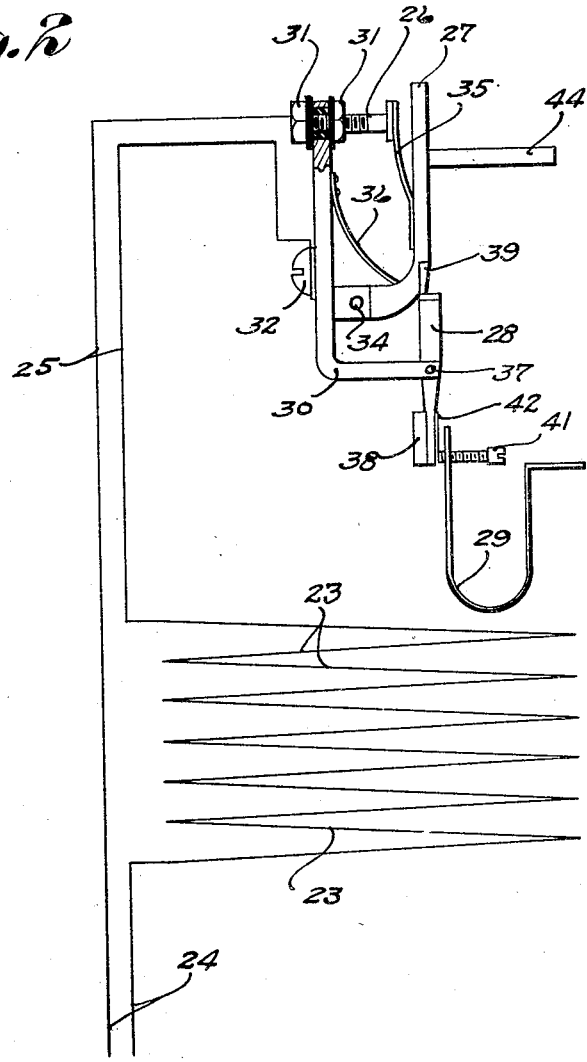

Patented July 21, 1931

1,815,060

UNITED STATES PATENT OFFICE

GEORGE W. HARRIS, OF FERGUS FALLS, MINNESOTA

DENTAL WAX ELIMINATOR

Application filed September 10, 1928. Serial No. 304,963.

My invention has for its object the provision of an extremely simple and highly efficient dental wax eliminator and to this end, it consists of the novel devices and combinations of devices hereinafter described and defined in the claims.

In the accompanying drawings, which illustrate the invention, like characters indicate like parts throughout the several views.

Referring to the drawings:

Fig. 1 is a view of the improved dental wax eliminator principally in central vertical section; and Fig. 2 is a wiring diagram.

The numeral 3 indicates an open top annular oven removably mounted in a casing comprising concentric inner and outer shells 4 and 5, respectively. These shells 4 and 5 are radially spaced to leave an air insulating compartment 6 therebetween. This compartment 6 at its top is closed by a fixed cover member 7 on which is formed, directly over the shell 4 an upstanding annular bead 8 for a purpose that will presently appear. The oven 3 is concentrically positioned in the inner shell 4 and radially spaced therefrom to form a compartment 9 for a heating element. The top of the oven 3 is below the top of the shell 4 and the compartment 9 is closed by a recessed annular fixed cover member 10.

It is important to note that the oven 3 is loose from the inner cover member 10 so that it may be removed from the casings 4 and 5 through the bottom thereof as will presently appear.

The shell 5 extends materially below the shell 4 and is shaped to form a circumferentially expanded supporting base 11 having a multiplicity of air holes 12. The bottom of the casing 4 and 5 includes upper and lower bottom plates 13 and 14, respectively, spaced the former above the latter to afford a compartment therebetween which is filled with mineral wool 15 or other insulating material. The upper bottom plate 13 bears against the lower end of the shell 4 and the bottom member of the oven 3 and closes the open lower ends of the compartments 6 and 9. Said upper bottom plate 13 rests directly on the insulating body 15 and is supported therefrom. The lower bottom plate 14 bears against the lower end of the shell 5 and is held in place by a split ring 16 removably seated in an internal channel 17 in the base 11.

A cover 18 for the oven 3 is hinged at 19 to the cover member 7 and has secured to its under side a sheet of insulating material 20 which loosely rests directly on the bead 8. Resting on the bottom of the oven 3 is a thick body of plaster of Paris on which is laid a base member in the form of a metal grill 22. Within the compartment 9 is a heating element 23 and the lead wires therefore are indicated by the numerals 24 and 25. Interposed in the lead wire 25 is a switch comprising a relatively fixed contact member 26, a cooperating relatively movable contact member 27, a latch 28 and a thermally influenced element 29.

The contact member 26, as shown, is in the form of a screw-threaded headed bolt which loosely extends horizontally through a passageway in the upper end portion of an L-shaped bracket 30. This contact member 26 is rigidly but adjustably held against endwise movement in the bracket 30 by a pair of opposing nuts 31. Said contact member 26 is insulated from the bracket 30 and one section of the wire 25 is attached thereto and the other section of said wire is grounded at 32 to said bracket.

The bracket 30 at its horizontal portion is supported on a short pedestal 33 on the cover 18 at the center thereof and is rigidly secured thereto by a screw 34. Said pedestal 33 is of porcelain or other suitable insulating material which insulate the bracket 30 from the cover 18 and the screw 34 is insulated from said cover, as shown.

The movable contact member 27 is in the form of a lever having approximately the same shape as the bracket 30, with its lower horizontal portion overlying the lower horizontal portion of said bracket, and pivoted at 34 to bearing lugs on the upright portion of the bracket 30. The contact member 27 has a yielding terminal 35 which directly engages the head of the fixed contact member 26 and compensates for any variation between said contact members 26 and 27 and always insures a good contact therebetween.

A leaf spring 36 is provided for moving the contact member 27 to inoperative or open position in which its terminal 35 is out of engagement with the contact member 27 to break the circuit to the heating element 23. One end of the spring 36 is anchored to the upright member of the bracket 30 and its other or free end bears on the horizontal arm of the contact member 27 close to the elbow of said member and is under strain to open the same.

The latch 28 is provided for holding the contact member 27 in an operative position against the tension of the spring 36 and is in the form of an upright member intermediately pivoted at 37 to the outer end of the lower member of the bracket 30. On the lower end of the latch 28 is a weight 38 which normally holds said latch in an operative position. Formed on the contact member 27 is a stop lug 39 which when said contact member 27 is closed rests on the upper end of the latch 28 and holds the contact member 27 closed.

The thermally influenced element 29 may be of any well known type and, as shown, is of U-shaped formation. The body of this thermally influenced element 29 extends into a pocket 40 in the cover 18 and one of its arms extends laterally over the top of the cover 18 and is rigidly secured thereto by screws. The other or free arm of the element 29 extends above the top of the cover 18 and has mounted therein an adjusting screw 41 which impinges against the lower weighted end of the latch 28. This thermally influenced element 29 is arranged to move in the plane of the movement of the latch 28 and a piece of the mica 42 is interposed between the latch 28 and screw 41 and secured to said latch to insulate the thermally influenced element 29 from the latch 28. The pocket 40 which extends into the oven 3 is spaced from the walls of said oven so that it is entirely surrounded by heat. Said pocket 40 is lined with an insulating material 43 which protects the element 29 from the intense heat in the oven.

The arrangement of the thermally influenced element 29 in respect to the latch 28 is such that when said element is expanded by heat, it moves said latch from under the stop lug 39 and thereby releases the movable contact member 27 to the compressed spring 33 which moves said element into an inoperative position and thereby carries its terminal 35 out of contact with the contact member 26. A finger piece 44 in the form of a stem is attached to the upright portion of the contact member 27 and by the use of which said member may be reset. The entire switch is encased in a housing 45 secured to the cover 18 and has formed therein openings through which the adjusting screw 41 and finger piece 44 project.

Within the oven 3 resting on the grid 22 is a dental mold comprising a metal ring 46 having an investment of plastic material 47 containing a wax pattern 48 which may be assumed to be an inlay for a tooth. The customary recess 49 is formed in one end of the plastic material 47 with a sprue lead from the wax pattern 48 to the recess 49 for the escape of the wax during the elimination thereof by heat.

To eliminate the wax pattern 48 from the investment 47, said mold is placed in the oven 3 and the cover 18 closed. The movable contact member 27 is then closed by means of the finger piece 44 to complete the electric circuit 44 for the heating element 23. In closing the contact member 27, its yielding terminal 35 engages the fixed contact member 26 and is slightly compressed thereby. During the closing movement of the contact member 27 the stop lug 39 is moved slightly above the latch 28 which allows said latch to swing by gravity under the stop lug 38 and into contact with the adjusting screw 41. It may be here stated that when the contact member 27 is open, the latch 28 is held in an oblique position by the stop lug 39.

After the contact member 27 has been moved sufficiently to permit the latch 28 to move under its stop lug 28, the finger piece 44 is released and the yielding terminal 35 and spring 36 will move the contact member 27 slightly downward until stopped by the engagement of the stop lug 39 with the latch 28. When the contact member 27 is closed, the circuit for the heating element 23 is closed through the contact member 26, terminal 35, contact member 27 and bracket 30. As the heat in the oven 3 increases, the free arm of the thermally influenced element 29 carries the adjusting screw 41 toward the latch 28 and thereby gradually moves the same from under the stop lug 39 and allows the contact member 27 to be opened by the spring 36 to break the circuit to the heating element 23.

By adjusting the screw 41 the period of time in which the switch is closed may be varied, at will, so that any desired amount of heat may be supplied to the oven 3 for driving off the moisture contents in the investment 47 and melt the wax pattern 48 so that the same will flow through the sprue 50 into the recess 49 and on to the grid 22. Steam produced in the oven 3 during the elimination of the wax pattern 48 will escape therefrom under the loose cover 18. By the use of the above described thermally influenced element 29, the period of time in which the heat is applied to the oven 3 is entirely automatic so that after the operator places the mold in the oven 3, closes the cover 18 and switch he need All danger is eliminated by the use of this element 29, of not supplying sufficient heat to the oven 3 to drive off the moisture contents in the investment 47 and eliminate the wax pattern 48 or in creating too much heat with a result that the investment 47 and the wax pattern 48 are damaged to such an extent that they can not be used with the result that the work of producing another pattern will have to be repeated.

After the switch has been opened under the action of the thermally influenced element 29, the mold may be left in the oven 3 to gradually cool therewith. In case it is desirable to again use the oven 3, the cover 18 may be opened to carry the thermally influenced element 29 away from the heat in the oven 3 so that the same will very quickly assume normal position and permit the switch to be again closed.

In case it is necessary to remove the heating element 23, it may be very easily and quickly done by releasing the split ring 16 and removing the bottom plates 13 and 14, insulation 15, oven 3 and heating element 23.

What I claim is:

1. The combination with an open top oven, and a displaceable cover normally closing the same and having an external pocket extending into the oven and movable therefrom with the opening of the cover, of an electric circuit for the heating element including a switch carried by the cover, and means including a thermally influenced element in the pocket for opening the switch.

2. The structure defined in claim 1 in which the switch is arranged to be manually closed.

3. The combination with an open top oven, and a displaceable cover normally closing the same and having an external pocket extending into the oven and movable therefrom with the opening of the cover, of an electric circuit for the heating element including a switch carried by the cover, said switch being under strain to open, a trip normally holding the switch closed, and a thermally influenced element in the pocket for operating the trip to permit the switch to open.

4. The combination with an open top oven, and a displaceable cover normally closing the same and having an external pocket extending into the oven and movable therefrom with the opening of the cover, of an electric circuit for the heating element including a switch carried by the cover, said switch being under strain to open, a gravity positioned trip, a thermally influenced element in the pocket for operating the trip to permit the switch to open.

5. The structure defined in claim 4 in which the switch is arranged to be manually closed and held in a position to permit the trip to return to an operative position in which it holds the switch closed.

In testimony whereof I affix my signature.

GEORGE W. HARRIS.